United States Patent [19]

Schick

[11] Patent Number: 5,097,944
[45] Date of Patent: Mar. 24, 1992

[54] SEAL PROVIDING A TIGHT JOINT BETWEEN TWO SECTIONS OF A CONVEYOR BELT AND A COUPLING DEVICE FITTED WITH SAID SEAL

[75] Inventor: Jean-François Schick, Paris, France

[73] Assignee: Goro S.A., Chelles, France

[21] Appl. No.: 626,883

[22] Filed: Dec. 13, 1990

[30] Foreign Application Priority Data

Dec. 14, 1989 [EP] European Pat. Off. ........... 89403477

[51] Int. Cl.5 .............................................. B65G 15/30
[52] U.S. Cl. ................................. 198/844.2; 24/31 B; 24/33 B; 474/255
[58] Field of Search ............................. 198/844.2, 846; 24/31 B, 31 H, 33 B, 33 P, 38; 474/257, 255, 256, 253

[56] References Cited

U.S. PATENT DOCUMENTS

| 2,971,256 | 2/1961 | Leflon | 24/33 B |
|---|---|---|---|
| 4,023,339 | 5/1977 | Stolz | 198/846 X |
| 4,315,349 | 2/1982 | Stolz | 24/31 H X |
| 4,344,209 | 8/1982 | Harwood | 198/844.2 X |
| 4,641,398 | 2/1987 | Schick | 24/33 B X |
| 4,653,156 | 3/1987 | Stolz et al. | 24/31 B X |
| 4,671,403 | 6/1987 | Schick | 24/33 P X |
| 4,815,587 | 3/1989 | Musil | 198/844.2 X |
| 4,858,280 | 8/1989 | Schick | 24/33 B |
| 4,996,750 | 3/1991 | Musil | 24/33 B X |

FOREIGN PATENT DOCUMENTS

| 826723 | 1/1952 | Fed. Rep. of Germany . | |
|---|---|---|---|
| 833280 | 3/1952 | Fed. Rep. of Germany | 24/31 H |
| 2372353 | 6/1978 | France . | |
| 2593872 | 3/1988 | France . | |
| 634028 | 3/1950 | United Kingdom . | |
| 2169053 | 7/1986 | United Kingdom . | |

Primary Examiner—Joseph E. Valenza
Assistant Examiner—Cheryl L. Gastineau
Attorney, Agent, or Firm—Young & Thompson

[57] ABSTRACT

A seal fitted between two sections of a conveyor belt is constituted by a member of resilient material having a generally U-shaped cross-section which can be placed astride the end portion of a belt section to be assembled, beneath the belt-fasteners of the corresponding row of a coupling device. The web of the seal has a series of transverse cut-out portions so arranged as to receive the end portion of the hinge-knuckle of one of the belt-fasteners of the oppositely-facing row and to delimit a corresponding number of narrow strips which are intended to be applied against the coupling-pin. Each strip has the shape of a loop forming a projection opposite to the side which is to be applied on the coupling-pin. Thus the loop can be compressed or stretched-out to a greater or lesser extent according to the thickness of the conveyor belt.

2 Claims, 2 Drawing Sheets

SEAL PROVIDING A TIGHT JOINT BETWEEN TWO SECTIONS OF A CONVEYOR BELT AND A COUPLING DEVICE FITTED WITH SAID SEAL

BACKGROUND OF THE INVENTION

The present invention relates to the devices employed for coupling two sections of a conveyor belt. The invention is more particularly concerned with the belt-coupling devices constituted by two rows of fasteners having a generally U-shaped cross-section. These fasteners are intended to be fixed astride the ends of the two belt sections in order to be subsequently united by means of a hinge-pin inserted in the interengaged hinge-knuckles formed by said fasteners.

The basic design of this structure is such that a more or less substantial clearance exists between the hinge-knuckles of the two rows of belt-fasteners as well as between the hinge-knuckles of a predetermined row and the edge of the opposite end of the conveyor belt. Under these conditions, when a belt of this type is employed for transporting bulk materials which include fines such as coal, for example, these fines can pass through the interstices which thus exist in the coupling device. This in fact constitutes a disadvantage since the fines which pass through are liable to penetrate into the journal-bearings and roller-bearings of the guide rollers and drive pulleys of the conveyor belt. This is liable to result in risks of seizure and damage to the installation.

In order to overcome these disadvantages, it has already been proposed to add means for sealing the aforesaid belt-coupling devices as tightly as possible. Thus British patent No. 634,028 describes a coupling device in which provision is made for the addition of a bead of compressible material between the edge of each end of a conveyor belt and the hinge-pin which is engaged within the hinge-knuckles of the two rows of belt-fasteners. By reason of their compressibility, said beads accordingly assume the same shape as the opposite portions of the hinge-pin. However, by reason of the very fact that they are simply fitted within the space located between the coupling pin and the edge of one end of the conveyor belt, said beads are not really fixed in position and are therefore liable to move. Furthermore, as a result of the fact that they are not fixed in position, these beads may become twisted at the time of pivotal motion of the corresponding coupling device and may consequently be damaged in a very short time.

Moreover, the thickness of a bead of this type must be determined according to the thickness of the corresponding conveyor belt. It is therefore not possible to employ the same type of bead for very different belt thicknesses.

For the reasons given above, the invention is directed to a seal which is designed with a view to overcoming the disadvantages set forth in the foregoing and also to ensuring that the seal can be mounted with great ease.

SUMMARY OF THE INVENTION

The seal in accordance with the invention is constituted by a member of resilient material having a generally U-shaped cross-section which can be placed astride the end portion of a belt section to be assembled, beneath the fasteners of the corresponding row of a coupling device. Said seal is distinguished by the fact that:

the central web of said seal has a series of transverse cut-out portions so arranged as to receive the end portion of the hinge-knuckle of one of the belt-fasteners of the oppositely-facing row and to delimit a corresponding number of narrow strips which are intended to be applied against the coupling-pin on the side diametrically opposite to that of the end portion of the hinge-knuckle of one of the fasteners of the corresponding row, each narrow strip thus provided has the shape of a loop forming a projection opposite to the side which is to be applied on the coupling-pin and said loop can be compressed or stretched-out to a greater or lesser extent according to the thickness of the corresponding conveyor belt.

Thus the seal under consideration is perfectly immobilized after the fasteners of the corresponding coupling device have been fixed in position since the staples for fixing said belt-fasteners are caused to pass through both lateral branches of said seal. Moreover, this seal can be employed on conveyor belts having varying thicknesses. In fact, the loop formed in the strips which constitute the central portion or web of the seal enables said strips to expand or contract according to whether the conveyor belt is of substantial thickness or on the contrary of small thickness. Furthermore, the presence of the cut-out portions between said strips endows the web of the seal with considerable flexibility and precisely allows expansion or contraction of the web according to the greater or lesser thickness of the corresponding conveyor belt.

The present invention is also concerned with the coupling devices of the type recalled in the foregoing which are provided with two seals as defined earlier.

DETAILED DESCRIPTION OF THE INVENTION

Figure 1:
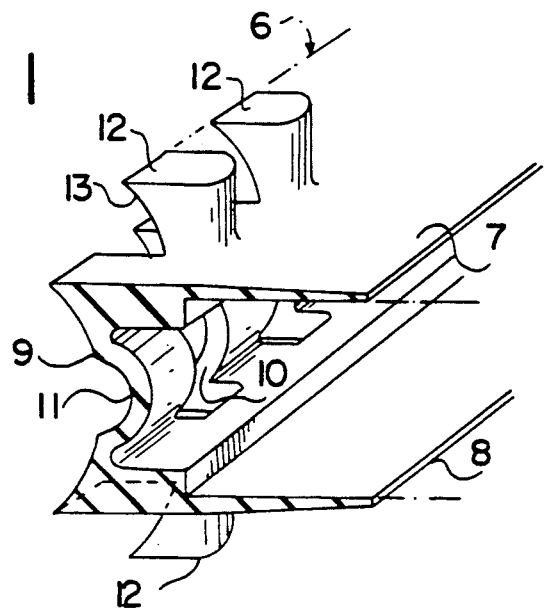
FIG. 1 is a view in perspective of a seal in accordance with the invention.
Figure 2:
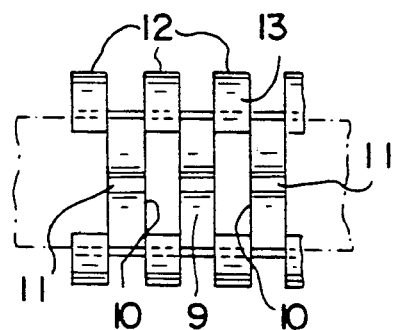
FIG. 2 is a partial view in elevation of the inner face of said seal.
Figure 3:
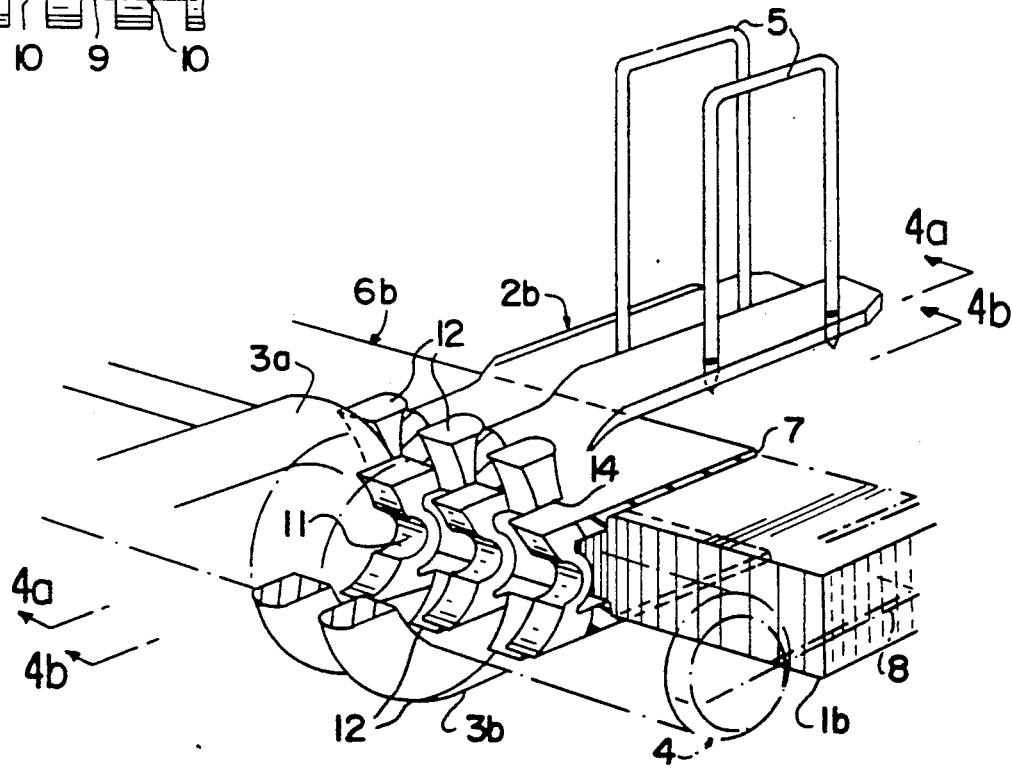
FIG. 3 is a partial view in perspective of a conveyor-belt coupling system constructed by means of a coupling device fitted with two seals in accordance with the invention.

As already mentioned, the seal shown in FIG. 1 is intended to be added to a device for coupling the ends of two sections 1a and 1b of a conveyor belt. This device is of the type comprising two rows of metal belt-fasteners 2a, 2b having the general shape of a U which are mounted astride the ends of both belt sections. These fasteners form hinge-knuckles 3a and 3b respectively which are therefore oriented in opposite directions. Said hinge-knuckles are relatively displaced in order to be located in interjacent relation and thus to constitute a virtual hinge within which is engaged a coupling-pin 4 constituted by a length of wire cable. The two rows of belt-fasteners are attached by means of metal staples 5, the pointed ends of which are clinched after having passed successively through a first arm of one of the belt-fasteners 2a or 2b, the corresponding section 1a or 1b of the conveyor belt, and the opposite arm of the same belt-fastener.

The seal shown in FIG. 1 and designated by the general reference 6 has a generally U-shaped cross-section. Said seal can thus be placed astride the end portion of one of the sections of the conveyor belt, beneath the fasteners of the corresponding row. The two lateral flanges 7 and 8 of the seal accordingly form two bands which are placed respectively against each face of the corresponding section of the conveyor belt. Thus at the time of insertion of the fastening staples 5, these latter pass through both flanges of the seal.

The central portion or web 9 of said seal has a series of transverse cut-out portions 10 which delimit a corresponding number of narrow strips 11. Each strip in fact has the shape of a loop forming a projection opposite to the side which is intended to be applied against the coupling-pin 4.

In proximity to the point of junction with the web 9 of the seal, each lateral flange 7 and 8 of this latter is adapted to carry a series of projecting teeth 12. Each tooth is located very precisely in vertically opposite relation to one of the cut-out portions 10 of the web 9. It is worthy of note that the face of the teeth 12 which is directed towards the coupling-pin 4 has a concave profile 13.

The seal thus formed is manufactured by molding of elastic material such as natural or synthetic rubber, for example. Said seal thus has a very high degree of flexibility which is clearly increased in the central portion or web 9 by the presence of the considerable number of transverse cut-out portions 10. In consequence, the intermediate strips 11 have very great flexibility and are thus very readily deformable.

The projecting teeth 12 of said seal are intended to be placed within spaces 14 located between two successive hinge-knuckles 3a or 3b of the corresponding row of belt-fasteners. In consequence, the cut-out portions 10 of the seal considered are in turn placed between two successive hinge-knuckles of said row of fasteners. Thus, at the time of assembly of the two rows of fasteners by means of the coupling-pin 4, the cut-out portions 10 and the strips 11 of the two seals 6a and 6b fitted in both rows are also in relatively displaced relation as in the case of the hinge-knuckles 3a and 3b of said fasteners. The end portions of the hinge-knuckles of the oppositely-facing row of fasteners are consequently placed within the cut-out portions 10 of a seal 6a or 6b considered and come into contact with the curved faces 13 of the projecting teeth 12 of said seal.

Figure 4:
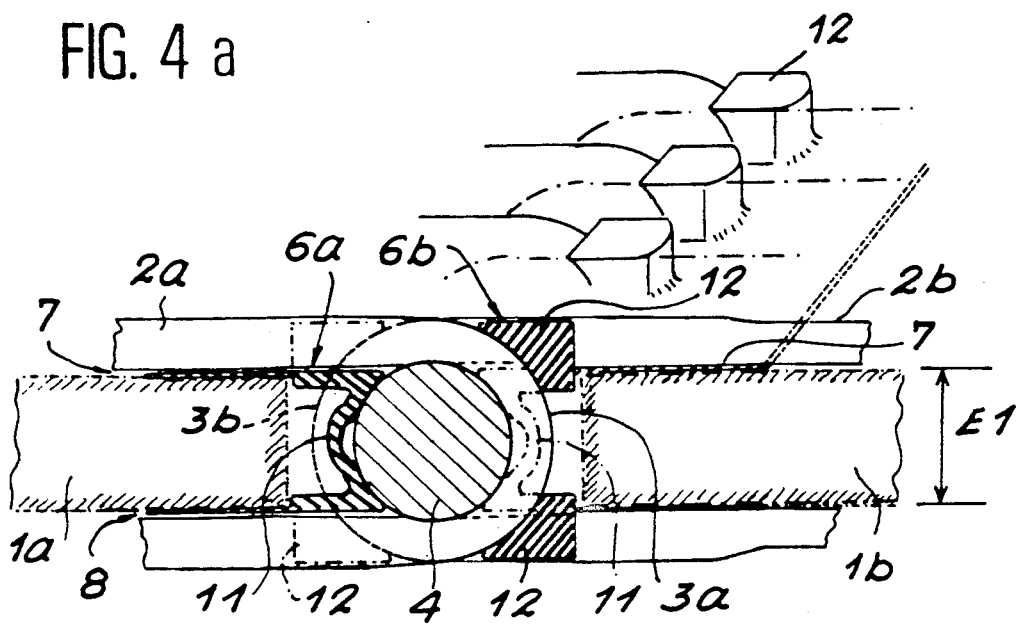
FIGS. 4a and 4b are sectional views taken respectively along lines 4a—4a and 4b—4b of FIG. 3.
Figure 4:
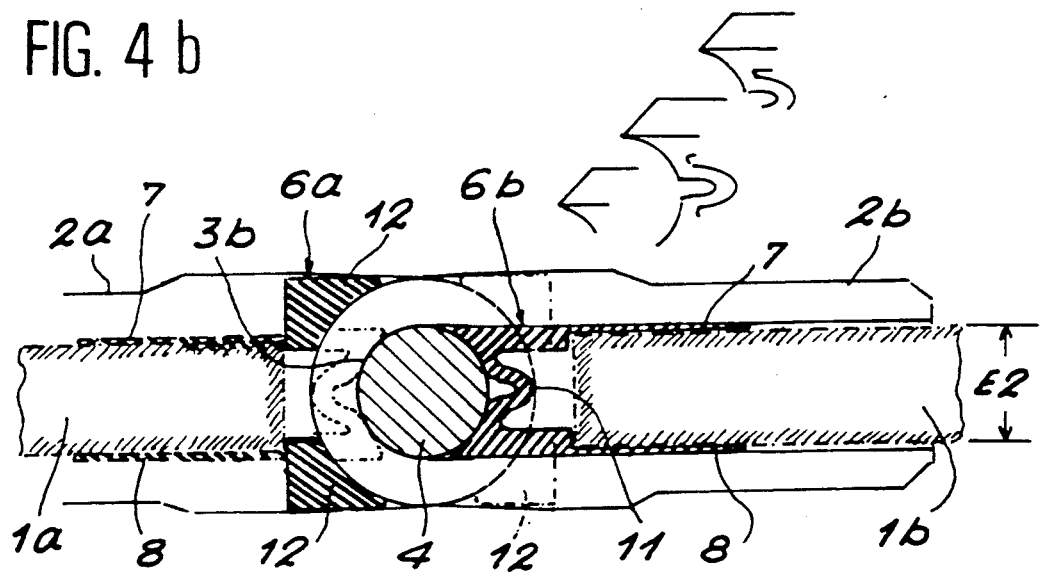

As for the seal strips 11, they are located opposite to the hinge-knuckles 3a or 3b of the corresponding row of belt-fasteners. In consequence, said strips are directly applied against the coupling-pin 4 on the side diametrically opposite to that of the end portion of the hinge-knuckle of one of the belt-fasteners of the corresponding row. Thus, as is clearly apparent from FIGS. 4a and 4b, the pin 4 is completely enclosed between the hinge-knuckle 3a or 3b of the belt-fasteners of one of the rows and one of the strips 11 of the seal belonging to the same row of fasteners (as shown in FIGS. 4a and 4b). This makes it possible to obtain perfect leak-tightness, all the more so since the projecting teeth 11 are engaged within the spaces between two successive hinge-knuckles and since, in addition, the end portions of the hinge-knuckles 3a or 3b of each row are engaged within the cut-out portions 10 of the web 9 of the seal belonging to the opposite row of belt-fasteners.

However, the main advantage of the seal in accordance with the invention lies in the fact that this latter can be employed on conveyor-belt sections of varying thickness. This arises from the fact that the strips 11 each have the shape of a loop and can consequently be caused to expand to a greater or lesser extent according to requirements or on the contrary to contract. As has already been mentioned, said strips have a high degree of flexibility by virtue of the numerous cut-out portions 10 provided in the web 9 of the seal.

Moreover, FIGS. 4a and 4b illustrate the use of the seal in accordance with the invention on conveyor belts having different thicknesses E1 and E2. As can be observed, when seals of this type are employed on conveyor belts of relatively substantial thickness, this simply has the effect of elongating the loop formed by the strips 11 (case of FIG. 4a). On the other hand, when seals of this type are employed with conveyor belts of smaller thickness, the loop formed by each strip 11 is consequently compressed to a greater or lesser extent in an accordion pleat (as in the case of FIG. 4b). There is thus considerable latitude, with the result that a single type of seal can be employed on belts having very different thicknesses. This accordingly constitutes an essential advantage over the seals provided in the prior art on coupling devices of the type considered.

The basic concept of the seal in accordance with the invention is such that it can be mounted beforehand within the belt-fasteners of one and the same row. The projecting teeth 12 of said seal are accordingly engaged between the spaces located between the hinge-knuckles of the row of fasteners considered. This is sufficient to ensure that the seals are held in position up to the moment when the corresponding row of fasteners is employed and fixed in position, the cross-section of the projecting teeth 12 being so dimensioned as to ensure that the seal is jammed in position to a certain extent.

In consequence, there are no additional operations to be performed in order to position the seals with which the two rows of belt-fasteners of the same coupling device are equipped. In fact, it is only necessary to adapt the two rows of fasteners on the ends of each of the two conveyor-belt sections to be assembled in order to ensure that the two corresponding seals are in turn suitably mounted and positioned, and that the end portions of the hinge-knuckles of the belt-fasteners of one of the rows consequently engage within the cut-out portions 10 of the web of the seal 6 provided within the fasteners of the opposite row.

In the example shown in the drawings, the seal in accordance with the invention is employed with belt-fasteners each constituted by two hinge-knuckles. However, said seal could just as readily be employed with fasteners provided in each case with a single hinge-knuckle or on the contrary with a greater number of hinge-knuckles. Moreover, the details of form of the seal in accordance with the invention may be modified according to the characteristics of the fasteners of the coupling device.

As has already been indicated, the invention is also concerned with coupling devices having two rows of belt-fasteners of the type considered and two seals added to both rows. These devices can be employed for coupling the sections of a belt which serves to convey bulk materials such as coal, gravel, and so on.

What is claimed is:

1. A seal providing a tight joint between two sections of a conveyor belt by means of two rows of generally U-shaped metal fasteners which are placed astride end portions of the two belt sections to be assembled and which are connected to each other by means of a coupling-pin inserted in interengaged hinge-knuckles formed by said fasteners, said seal being constituted by a member of resilient material having a generally U-shaped cross-section which can also be placed astride the end portion of a belt section to be assembled, beneath the fasteners of the corresponding row, wherein:

said seal has a central web having a series of transverse cut-out portions so arranged as to receive the end portion of the hinge-knuckle of one of the belt-fasteners of the oppositely-facing row and to delimit a corresponding number of narrow strips for contacting the coupling-pin on the side diametrically opposite to that of an end portion of the hinge-knuckle of one of the fasteners of the corresponding row, each narrow strip thus provided has the shape of a loop forming a projection opposite to the side which is to contact the coupling-pin and said loop can be compressed or stretched-out to a greater or lesser extent according to the thickness of the corresponding conveyor belt.

2. A seal according to claim 1, wherein the seal has flanges on opposite sides of the central web, and each said flange carries a series of projecting teeth near an intersection of said flange with the central web, each tooth being located in vertically opposite relation to one transverse cut-out portion of said web, said projecting teeth being intended to be placed within the spaced existing between two successive hinge-knuckles of the corresponding row of belt-fasteners.

* * * * *